3,293,195
ION EXCHANGE RESINS PREPARED FROM A MIXED RESIN OF VINYL PYRIDINE COPOLYMERS AND EPIHALOHYDRINS-POLYALKYLENE POLYAMINES AND METHODS OF MAKING AND USING SAME

Albert H. Greer, Haddonfield, N.J., assignor to Ritter Pfaudler Corporation, a corporation of New York
No Drawing. Filed Nov. 29, 1963, Ser. No. 327,099
19 Claims. (Cl. 260—2.1)

This invention relates to an improved synthetic polymeric anion exchange resins and to a method of preparing such resins. More particularly, this invention relates to an improved non-agglomerating anion exchange resin of the type prepared by the condensation of an epihalohydrin and a polyalkylene polyamine as shown in U.S. Patent No. 2,469,683 to James R. Dudley et al.

Anion exchange resins, in order to be satisfactory for use, must be substantially insoluble in water, dilute acids and alkalies. They must be capable of resisting physical transformation, such as undue swelling, or mechanical disintegration, such as spalling or shattering of the resin beads, when in contact with the solution they are used to treat. They should not discharge color during the anion exchange cycle and they should be chemically stable in the presence of the aqueous solutions to be treated and strongly alkaline regeneration solutions. In addition, they must have a high useful or operating capacity for removing anions from aqueous solutions, and be capable of being repeatedly regenerated for reuse when they become exhausted.

It has been observed that agglomeration occurs when fresh cation and ion exchangers are intermittently mixed, especially when they are in the hydrogen and hydroxide forms respectively. With multiple bed systems, strong acid cation exchangers and strong base anion exchangers rather infrequently show this phenomenon. However, with weak base anion resins agglomeration frequently occurs in either the fresh resin or in the used resin.

The agglomeration of the resin chiefly occurs after exhaustion of the resin during the backwash part of the resin's operational cycle. When utilizing anion exchange resins in a normal operation cycle, the resin is never exhausted to its ultimate capacity, as the amount of electrolytes appearing in the effluent water is maintained as low as possible. When the concentration of electrolytes begins to rise, the exhaustion operation is stopped. This is conventionally called the "breakthru" point. At this point the resin is approximately 50% exhausted when using a standard regeneration dosage. In the case of weak base anion exchange resins, the regeneration dosage is from 3 to 4 lbs. of sodium hydroxide per cubic foot of resin. As a result of this partial exhaustion, the weak base resin is partially in the regenerated form and partially in the exhausted form, so that during the backwash operation the resin particles appear to adhere to one another in cluster-like forms, presumably because of opposite charge effects. As a result of the formation of such clusters, the backwash operation is not effective in removing accumulated foreign particles or dirt. In addition, channelling of the resin bed is likely to occur in the subsequent regeneration and exhaustion operations. As a result of channelling, increased rinse volumes will be required to remove the regenerant and high leakage of electrolytes will occur during exhaustion. Another consequence of agglomeration is that it interferes with the proper grading of the resin particles during the backwash operation, which grading is essential if the proper flow characteristics of the resin bed are to be maintained.

Various methods have been proposed to overcome this agglomeration or clumping, especially with mixed bed systems. A method is described in German Patent No. 1,045,978 which involves the treatment of the particular resin with a finely divided oppositely charged ion exchange resin. U.S. Patent No. 2,961,417 discloses the treatment of various mixed bed exchange resins with water soluble resinous polymeric polyelectrolytes. The purpose of this treatment was to neutralize the surface charges of the anion or the cation exchange resin by contacting it with an oppositely charged water soluble polyelectrolyte. In a paper presented by Abrams and Sufley, at the 141st National Meeting of the American Chemical Society, March 26, 1962, a method was described for the deagglomeration of mixed bed resins and of weak base resins wherein the resin bed was treated with a dilute slurry of bentonite in water at 60° C.

Each of the above described methods involved the addition of an extraneous and, in some cases, an expensive chemical. Also, in the case of the bentonite treatment, the resin bed must be taken out of the column and intermittently contacted with the bentonite suspension. This is time consuming and involves a complete suspension of operation of the resin during the normal operating procedure. In the majority of the cases described, no indication was given as to whether the treatment suggested was permanent.

It is an object of the present invention to provide a base anion exchange resin in the form of spheroidal particles which will not agglomerate during normal operating procedures.

A further object of the present invention is to provide a weak base anion exchange resin in bead form which, without requiring treatment with an extraneous substance, will be permanently non-agglomerating during normal operating procedures.

Another object of the present invention is to provide a weak base anion exchange resin which is a condensation product of an epihalohydrin and a polyalkylene polyamine and, as part of its internal structure, a nitrogen containing crosslinked copolymer which will inhibit and prevent agglomeration of the resin beads during normal operating procedure.

It is a further object of the present invention to provide a process of preparing weak base anion exchange resins in the form of beads which will be permanently non-agglomerating during normal operating procedures.

It is still a further object of the present invention to provide a novel process for the removal of anions, especially strong acid anions, from aqueous solutions.

Other objects of the present invention will become apparent to those skilled in the art upon consideration of the following specification.

The novel weak base anion exchange resins of the present invention are prepared in accordance with my novel process. In general, I prepare a copolymer of a monovinyl aliphatic or heterocyclic nitrogen containing compound with a suitable crosslinking agent containing two or more polymerizable vinyl or allyl groups under oxidizing conditions to a stage where the copolymer is not fully crosslinked but is still in a liquid or fluid state. I then prepare a partial condensate, or precondensate syrup of an epihalohydrin and an aqueous solution of a polyalkylene polyamine containing in suspension or solution the partially cross-linked copolymer. Polymerization is proceeded only to the point where a somewhat viscous syrup is obtained by allowing the epihalohydrin to condense with the polyalkylene polyamine and the nitrogen containing partially crosslinked copolymer. The partially condensed, slightly viscous material is then added to an inert organic non-solvent suspending liquid containing a small amount of dispersing agents described in my patents U.S. 2,898,309 and U.S. 3,005,786 and thereafter by mechanical agitation converting the resulting dispersed globules of the partially condensed syrup into solid resin beads by heating to remove as much of the water contained in the precondensate syrup in the form of an azeotrope mixture with the organic suspending liquid and then to continue the heating to permit the complete polymerization of the resin condensate. After the non-solvent is drained from the spheroids or beads, the spheroidal particles are subjected to a steam distillation to remove the occluded non-solvent suspending liquid.

More particularly, the process of the present invention involves the formation of a copolymer of a polymerizable monomer containing at least one viniyl or allyl radical and an available amino group with a suitable crosslinking agent containing two or more polymerizable vinyl or allyl groups of an aliphatic, aromatic or heterocyclic moiety. The copolymer is prepared either in bulk, solution or suspension with an oxidizing catalyst and then is suspended after partial polymerization into the water to be used for dissolving the polyalkylene polyamine. In the case of suspension polymerization, it is desirable to conduct the polymerization of the copolymer in the same water phase to be used for dissolving the polyalkylene polyamine. The copolymer when prepared in bulk or in solution can be added to the polyalkylene polyamine prior to the addition of the epihalohydrin or after the addition of the epihalohydrin. It is preferred that the copolymer be added prior to the addition of the epihalohydrin. In the case of the suspension type of polymerization, the addition of the epihalohydrin follows the addition of the polyalkylene polyamine to the copolymer.

After the polymerization of the copolymer is allowed to proceed to a point where a partially crosslinked copolymer is obtained, the copolymer is easily dissolved or dispersed into the aqueous solution of the polyalkylene polyamine. The condensation syrup is prepared by the addition of the epihalohydrin to the aqueous solution of the copolymer suspended or dissolved with the polyalkylene polyamine under cooling conditions. In the case where the copolymer is added after the addition of the epihalohydrin, the copolymer is simply dissolved into the condensate syrup. The condensed syrup which results is then placed in a suitable polymerization vessel equipped with a stirrer, a thermometer and a distilling column suitable for removing the azeotropic mixture formed from the water and the non-solvent suspending medium employed. It is desirable to employ a small amount of surface active agent or dispersing agent which will prevent or minimize agglomeration of the globules of condensate syrup. After allowing the syrup to separate, stirring is begun and the stirrer speed adjusted so as to produce globules or spheroidal particles of between 10 to 60 U.S. Standard Screen mesh size. The temperature of the reaction mixture is increased in order to remove as much water as possible in the form of an azeotropic mixture and the temperature is further increased in order to complete the polymerization and curing of the resin. With monochlorobenzene as the preferred solvent, the azeotrope is about 90° C. and the curing temperature is about 125° C. The non-solvent suspending medium is then removed by filtration and the resin is subjected to a steam distillation in the presence of a small amount of alkaline medium to remove the remainder of the suspending medium.

The vinyl nitrogen containing compounds, which are suitable for this invention, are any of the monomeric amines which contain at least one vinyl or allyl group and which will polymerize under suitable conditions to form a polymer with a suitable crosslinking agent and which also contain an available nitrogen group which is either a primary, secondary, or tertiary amine group and which will condense with an epihalohydrin. The vinyl amine monomer may be aliphatic or heterocyclic. The aliphatic nitrogen containing vinyl monmers are vinyl-amine, allylamine, dimethylamino methyl methacrylate, dimethylamine ethyl acrylate, diethylamino ethyl acrylate, or any of the suitable dialkylamino alkyl acrylates or methacrylates. Another class of vinyl amines which are aliphatic heterocyclic in nature, and which can be suitably used in this invention are the alkylpyridyl alkyl acrylates. An example of this class is ethylpyridyl ethyl acrylate. Another suitable group of vinyl amines are the vinyl substituted nitrogen containing heterocyclic compounds such as the vinyl pyridines, vinyl alkyl pyridines, vinyl pyrroles, vinyl pyrimidines, vinyl pyridazines, vinyl pyrazines, vinylquinolines, and vinyl isoquinolines. The preferred vinyl derivatives of nitrogen containing monomers are the vinyl pyridines represented by 2-vinyl pyridine, 4-vinyl pyridine, or 2-methyl 5-vinyl pyridine.

The other component of the copolymer is an unsaturated crosslinking compound. This is a well defined type of compound having at least two or more vinyl or allyl groups and having the faculty of polymerizing with vinyl or allyl substituted monomers to form a crosslinked or partially insolubilized resin. They may be polyvinyl aromatic, aliphatic or heterocyclic unsaturated compounds. The most important type of crosslinking agents are the polyvinyl aromatic compounds such as divinyl and other polyvinylbenzenes including trivinyl and tetravinyl benzenes, divinyl toluene, divinyl alkylbenzenes, divinyl xylenes, divinyl naphthalenes and divinyl diphenyls. Examples of unsaturated aliphatic compounds which may be used advantageously and which contain two vinyl groups are: divinylsulfone, divinylketone; vinylethinyl hydrocarbons such as vinylacetylene and divinylacetylene, vinylmaleate, vinyl esters of acrylic, methacrylic, and ethacrylic, acids such as vinylacrylate, vinylmethacrylate, vinylethylacrylate; divinyl esters of dibasic acids such as divinyloxalate, divinylmaleate, divinylmalonate, divinylsuccinate; and acrylic diesters of aliphatic polyhydric alcohols such as diethylene glycol dimethacrylate, ethylene glycol dimethacrylate, diethylene glycol diacrylate, glycerine dimethacrylate and ethylene glycol diacrylate. Other unsaturated aliphatic groups than the latter group may be used although the group should preferably have a terminal double bond. Among such groups which may be used to replace the vinyl group are the allyl group, and the 3-N-butenyl group. In the case of a heterocyclic crosslinking agent, such materials as the divinyl pyridines, divinyl pyrroles, divinyl pyrimidines, etc., may be used. The preferred crosslinking compounds are divinylbenzene, ethylene glycol dimethacrylate and diethylene glycol dimethacrylate.

The copolymer resins used in this invention should contain a predominant amount on a molar basis of the mono vinyl compound. It is preferred that the mono vinyl compound constitute from 50–99.9% on a molar basis of the copolymer. Therefore, the divinyl compounds should constitute from 0.1–50% of the mixture on a molar basis. Best results are obtained when the monovinyl moiety constitutes from 80–99.5% of the copolymer resin and the crosslinking agent from 0.5–20% (both on a weight basis). It is preferred that the amount of copolymer to be used with the condensate of the epihalohydrin and the polyalkylene polyamine constitute from 0.05 to 1.0 mole per moles of polyalkylene polyamine. The optimum composition is one prepared from 0.1 to 0.5 mole of copolymer for every mole of polyalkylene polyamine.

The polymerization of the copolymer resin used in this invention is conducted in the presence of well known oxidizing catalysts or those catalysts capable of producing free radicals. These catalysts include oxygen, organic peroxides such as acetyl peroxide, tertiary butyl hydroperoxide, benzoyl peroxide and hydrogen peroxide; so-called per-salts such as potassium persulfates, etc. The free radical producers are the azoketonitriles such as azo-bisisobutyronitrile and azo-bis-cyclopropylpropionitrile, etc. The free catalyst may be employed in suitable amounts ranging from 0.1–2% by weight based on the weight of the monomeric material to be polymerized.

The process of polymerizing the monovinylamine with the crosslinking agent can be performed either in bulk, in a solvent or in an aqueous suspension. As previously stated, it is preferred to employ suspension polymerization for the preparation of the copolymer and to use the same aqueous medium for the dissolution of the polyalkylene polyamine. The preferred procedure then, would be to dissolve the desired amount of polymerization catalyst into the mixture of the monovinylamine and the crosslinking agent and then to suspend the entire mixture in a known weight of water with rapid agitation, so as to disperse the monomers throughout the entire aqueous medium. The polymerization of the copolymer is performed at a temperature between 30–70° C. The preferred temperature is between 55–65° C. The time of the polymerization is controlled so that the copolymer that is formed should reach the initial stage of the gel point, the gel point being defined as that point where the liquid monomers begin to show thread-like properties when a sample is removed from the polymerization vessel. In order to prevent further cross-linking, the source of heat is removed and the required amount of polyalkylene polyamine is added at once to terminate the polymerization of monovinylamine and crosslinking agent. The preferred copolymer should be thoroughly dispersed in the aqueous solution of the polyalkylene polyamine prior to the addition of the epihalohydrin.

In the case where solution polymerization of the monovinylamine and the crosslinking agent is employed, it is generally preferred to use a 1:1 ratio of monomer to solvent containing the desired initiation catalyst. Generally, those solvents are used within which the monomers and catalysts and polymer are completely soluble. The solvent should also be soluble in water and inert to the monomers. Solvents such as methyl alcohol, ethyl alcohol, isopropyl alcohol, acetone, ethylene glycol and the like, are suitable for this polymerization. In the case of solution polymerization, the polymerization can be performed at ambient temperature to reflux temperature of the solvent. The end point of the polymerization is taken when a sample drop of the material is suspended in water and shows a slight tendency to form an insoluble phase. The organic solution containing the copolymerized monomer is added to an aqueous solution of the polyalkylene polyamine which should completely suspend or dissolve the polymer. Thereafter, an epihalohydrin is added to form the condensate polymer.

It is desirable to use at least 2 moles of epihalohydrin for each mole of polyalkylene polyamine. Preferably between about 2.5 to 4 moles of epihalohydrin for each mole of polyalkylene polyamine are employed. In the case of epichlorohydrin and tetraethylenepentamine, I desire to use from about 2.5 to 3.0 moles of the former to 1 mole of the latter, since this produces an anion exchange resin having optimum capacity.

I prefer to add the epihalohydrin to the solution or suspension of the copolymer in an aqueous solution of the polyalkylene polyamine at a temperature of about 10–40° C. At the end of the addition of the epihalohydrin, the condensate syrup should be nearly clear. In the case where the partially crosslinked copolymer is added after the addition of the epihalohydrin, the same results are obtained after several minutes of mixing. I have found that epichlorohydrin is the most desirable of the epihalohydrins used in producing polymerized condensate with the polyalkylene polyamines. Epibromohydrin is also effective.

The polyalkylene polyamines to be used in preparing the polymerizate are desirably the lower (one to eight carbon atoms, preferably not more than four carbon atoms) polyalkylene polyamines such as diethylene triamine, triethylene tetramine, tetraethylenepentamine, etc. Tetraethylenepentamine is particularly suitable.

I prefer to mix the condensate syrup with the liquid, organic, non-solvent suspending medium containing a dispersing agent in a ratio of between about 1:15 respectively, based upon the weight of the syrup, up to a ratio of 1:2 in order to attain the proper size of beads or spheroidal particles required. In general, I desire that the spheroidal particles of resin shall be of such a size that the bulk of the material will pass through a U.S. Standard Sieve Series 10 mesh screen, but will be retained by a U.S. Standard Sieve Series 60 mesh screen. Preferably the particles should be within a range of 20- to 50-mesh size.

The dispersing agents of the present invention include polyvinylchloride, chlorinated rubber, chlorosulfonated polyethylene and other halogenated long chain polymeric hydrocarbon compounds made up of halogenated repeating polyethylene, polybutadiene and polyisoprene moieties preferably of at least about 500 repeating units having a molecular weight of at least about 10,000. In these compounds, the halogen is attached either directly to a carbon linkage or to a sulfur atom which is in turn linked to a carbon atom. These dispersing agents must be soluble in the inert organic non-solvent suspending liquid employed and must be thermally stable at the temperatures of the polymerization which frequently are as high as 140° C. Among the preferred dispersing agents used in the process of this invention are chlorinated rubbers, such as products sold under the trade-name "Parlon–125." Another preferred dispersing agent is chlorosulfonated polyethylene sold under the trademark "Hypolon–20." However, other dispersing agents that will provide satisfactory protective conditions for the prevention of agglomeration of spherical bodies while in suspension may be used. The dispersing agents may be employed in low concentrations to provide their desired function in the process. An effective concentration range of 0.25–3%, preferably between about 0.25% and 2%, based upon the weight of inert organic non-solvent suspending liquid, is sufficient to provide substantially uniform size beads. While higher concentrations of these agents may be employed, it had been found that larger concentrations increase the viscosity of the suspending liquid to a point which may adversely affect the uniform particle size distribution of the beads. The optimum amount of suspending agent varies somewhat depending upon the rate and type of agitation, the specific organic non-solvent suspending liquid and its density, the specific resin syrup and its viscosity and the desired bead size.

It has been found that when the dispersing agents described above are employed to produce anion exchange resin beads with a predetermined stirrer speed, it is not necessary to change the stirrer speed during any part of the polymerization, and yet beads of highly uniform particle size are produced and no agglomeration of beads occur during the polymerization. It has been found that those dispersing agents disclosed in my patent U.S. 3,005,786, are particularly suitable for providing a particle size distribution with most of the beads falling within the desired 20–40 mesh size.

The organic non-solvent suspending liquid which may be used in the process of the present invention must be insoluble in water, thermally stable at temperatures of up to at least 140° C., inert to both the initial aqueous resin forming materials, and their partial or final condensation products. In addition, it should have a boiling point above about 80° C., preferably above about 100° C., and have a specific gravity approximately that of the resin syrup which is generally between 1.1–1.5. Among the inert organic non-solvent liquids which may be employed are propylidene dichloride, trimethylene dichloride, propylene chloride, trichloroethylene, 1,1,2-trichloroethane, monochlorobenzene, ortho-dichlorobenzene, 1,2,4-trichlorobenzene, symmetrical dichloroethylether, nitrobenzene, nitroalkylbenzene, the halogenated aliphatics such as bromohexane, bromo-octane, bromopropane, diphenylether, toluene, xylene, trialkylbenzene and ethylbenzene. The preferred non-solvent liquids are monochlorobenzene and ortho-dichlorobenzene.

It is usually desirable, in accordance with the process of the present invention, to remove at least a portion of water from the dispersed resin syrup in order to increase the reflux temperature of the system, particularly if the resin beads are to be cured in a non-solvent liquid. After this water removal, the resin beads are cured by heating at an elevated temperature of about 90–130° C. until the beads are hardened.

In the continuation of the process of the present invention, the excess amount of suspending medium is drained from the beads by ordinary methods of filtration and then the material is subjected to a steam distillation to remove any and all of the occluded suspending medium. The resulting weak base anion exchange resin is especially suitable for the removal of strong acid anions from aqueous solution and will not agglomerate during its normal operating cycle.

The mechanism or principle by which the present invention operates is not known with certainty. It could be assumed that the presence of a cross-linked copolymer chain acts as a matrix or building block for the main body of the epihalohydrin-polyalkylene polyamine condensate to form a more stable structure. Such a stable structure could tend to minimize the internal swelling of the resin beads during the exhaustion or regeneration cycle and thus reduce the agglomeration of the resin beads when confined in a rigid body. Also, presumably, the cross-linked copolymer, having a matrix consisting of either carbon-carbon bonds or carbon-oxygen-carbon bonds which have a tendency to be less conductive in charge transfer than a carbon-nitrogen bond, could act as a surface insulator of each resin bead and prevent the agglomeration of resin beads by reducing the surface charges. While these theoretical considerations are offered as to why the addition of a nitrogen containing partially crosslinked copolymer to an epihalohydrin-polyalkylenepolyamine condensate prevents the agglomeration of the resin beads, this invention is not restricted to any particular theory of operation.

In order to disclose more clearly the nature of the present invention, specific examples illustrating the preparation of the anion exchange resins of the present invention will hereinafter be described. This is done solely by way of example and is not intended to delineate the scope of the invention or of the appended claims. In the following examples, all parts are parts by weight unless otherwise specified. All sieve sizes are U.S. Standard Sieve Series.

EXAMPLE 1

A. *Preparation of copolymer*

Into a reaction vessel equipped with a stirrer, thermometer, and a dropping funnel were placed 550 grams of water and the water was heated to 65° C. A mixture containing 38 grams (0.2 mole ratio to tetraethylenepentamine) of ethylpyridylethylacrylate, 3.8 grams of ethylene glycol dimethacrylate and 0.7 gram of azo-bis-isobutyronitrile was added to the water. The mixture was heated for one hour at the end of which time a sample of the suspension showed a slight tackiness.

B. *Preparation of condensate syrup*

About 237 grams of tetraethylenepentamine was added with stirring to the copolymer suspension from Part A at one time, whereupon the copolymer dispersed throughout the entire aqueous solution. The mixture was cooled to 20° C. with a surrounding ice-bath and 322 grams of epichlorohydrin (mole ratio of epichlorohydrin to tetraethylenepentamine 2.8:1) was added dropwise with stirring at such a rate as to keep the temperature below 40° C.

C. *Preparation of resin beads*

Into a resin flask equipped with a stirrer, thermometer and distillation head containing a water trap, were placed 1200 mls. of commercial monochlorobenzene containing 1% by-weight of chlorinated rubber ("Parlon–125"). The condensate from Part B was poured into the suspending medium and allowed to separate. Mechanical stirring was begun to produce maximum bead size distribution between −20+40 mesh. The temperature of the mixture was raised to 90° C. and an azeotrope mixture of water and monochlorobenzene began to distill. Distillation was continued at 90° C. until most of the water had been removed. At this point, all of the beads of resin were distinctly defined. Heating was continued until the temperature reached 125° C., and continued at this temperature for an additional 3 hours. The mixture was cooled and the resin beads filtered from the suspending medium. The material was then subjected to steam distillation with live steam until all of the monochlorobenzene had been removed. Upon regenerating the hard translucent beads with a 5% aqueous sodium hydroxide solution, the resin had an operating capacity of 28 kgr./cu. ft. using a regeneration dosage of 3.2 lbs./cu. ft. of sodium hydroxide, and an influent feed water of 200 p.p.m. free mineral acid and 17 p.p.m. of silica. The rinse volume of the material was 6.5 bed volumes. The material did not show any agglomeration after several hundred repeated cycles on a column test.

EXAMPLE 2

A. *Preparation of copolymer*

In a small reaction flask equipped with a stirrer and thermometer there was added 38 grams (0.2 mole ratio to polyalkylene polyamine) of ethylpyridylethylacrylate, 3.8 grams of ethylene glycol dimethacrylate (10% of the weight of the monovinyl monomer) and 0.5 gram of azo-bis-isobutyronitrile as catalyst. The mixture was heated with stirring to 70° C. and the flow of the material was found to be 9.5 seconds when allowing 10 ml. to flow through a pipette. The material was heated at 70° C. for approximately 30 minutes, whereupon the flow of 10 ml. measured by the same tube previously used, was found to take 20 seconds. The entire mixture was then added to a three-necked flask containing 237 grams of tetraethylenepentamine dissolved in 550 grams of water, the flask being equipped with a stirrer, thermometer and dropping funnel, and surrounded with a cooling bath. The solution was cooled to approximately 20° C.

B. *Preparation of condensate*

To the above-pre-cooled solution there was added 322 grams of epichlorohydrin (mole ratio of epichlorohydrin to tetraethylenepentamine 2.8:1) during a period of 1 to 2 hours at a maximum temperature of 35° C. At the end of this time, the solution was fairly clear in appearance.

C. *Preparation of polymer*

Using the same apparatus as described in Part C of Example 1, the condensate prepared in Part B was added, with a prearranged stirring speed so as to yield a maximum of −20+40 mesh beads after the polymerization, to a suspending medium of 1200 mls. of commercial monochlorobenzene containing 0.5% by-weight of chlorinated rubber ("Parlon–125"). When the termperature of the mixture reached 90° C. an azotrope mixture of water and monochlorobenzene began to distill. Distillation was continued at 90° C. until most of the water had been removed. At this point, all the beads of the resin were distinctly defined. The heating was continued until the temperature reached 125° C. and continued at this temperature for an additional 3 hours. The mixture was cooled and the resin beads filtered from the suspending medium. The beads containing the occluded monochlorobenzene were then subjected to a steam distillation with live steam in the presence of a small amount of trisodium phosphate for about 3 hours until all of the monochlorobenzene was removed.

With a regeneration dosage of 3.5 lbs./cu. ft. of sodium hydroxide as a 5% solution, an operating capacity of 25.8 kgr./cu. ft. was obtained when using an influent feed water of 200 p.p.m. free mineral acid and 17 p.p.m. silica. The rinse volume was found to be 6.4 bed volumes. The material did not agglomerate during the operating cycle after long term cycling.

EXAMPLE 3

A. *Preparation of condensate*

Employing equipment similar to that of Part B in Example 1, a solution was made containing 237 grams of tetraethylenepentamine in 550 grams of water. The solution was cooled to approximately 20° C. and 322 grams of epichlorohydrin (mole ratio of epichlorohydrin to tetraethylenepentamine 2.8:1) was added during a period of 1 to 2 hours at a maximum temperature of 40° C.

B. *Preparation of copolymer*

A solution of 26 grams of 4-vinylpyridine (0.2 mole ratio of tetraethylenepentamine), 5.2 grams of 50% commercial divinylbenzene (10% by weight of the vinylpyridine) and 0.5 gram of azo-bis-isobutyronitrile as catalyst was prepared. The mixture was heated to about 60° C. and the polymerization was followed by the change of viscosity of the medium. When the viscosity had increased to approximately 2½ times the viscosity of the original monomers, the entire mixture was added to the previously prepared condensate of Part A and mixed.

C. *Preparation of polymer*

In a similar apparatus, described in Part C of Example 1, the material of Part B was suspended in 1200 ml. of commercial monochlorobenzene containing 0.5% by weight of chlorinated rubber ("Parlon–125") and allowed to separate. Mechanical stirring was begun at a previously determined stirrer speed to produce a maximum size distribution of between −20+50 mesh. When the mixture was heated with a surrounding oil bath and the temperature reached 90° C., an azeotrope mixture of water and monochlorobenzene began to distill. Distillation was continued at 90° C. until most of the water had been removed. At this point, all of the beads were definitely well defined. The heating was continued until the temperature reached 125° C. and then continued at this temperature for an additional 3 hours. The mixture was cooled and the resin beads filtered from the suspending medium. The resin beads were then steam distilled with live steam for about 3 or 4 hours in the presence of a small amount of phosphate until all of the monochlorobenzene was removed. The ion exchange resin when treated with a regeneration dosage of 3.2 lbs./cu. ft. of sodium hydroxide as a 5% solution had an operating capacity of 27.0 kgr./cu. ft. using an influent feed water of 200 p.p.m. mixed mineral acids and 17 p.p.m. silica. The rinse volume was found to be 2.5 bed volumes. The material did not aggregate after long-term operating cycling.

EXAMPLE 4

A. *Preparation of copolymer*

Into a flask equipped with a stirrer, thermometer, and heating mantle were placed 30 ml. of methyl alcohol, 22 grams of 2-methyl 5-vinylpyridine (0.2 mole ratio to polyalkylene polyamine), 4.4 grams of 50% divinylbenzene (10% of the weight of the methylvinylpyridine) and 0.5 gram of azo-bis-isobutyronitrile. The clear solution was heated at 65–70° C. for 30 minutes and cooled.

B. *Preparation of condensate and polymer*

In a flask equipped with a stirrer, thermometer, dropping funnel and a cooling bath were placed 550 grams of water and 237 grams of tetraethylenepentamine. The prepolymer from Part A was added at once and stirring begun. The mixture was cooled to 20° C. and 322 grams of epichlorohydrin (mole ratio of epichlorohydrin to tetraethylenepentamine 2.8:1) was added dropwise during 2 hours keeping the temperature below 35° C. At the end of this time, the condensate was placed in the polymerization equipment described in Part C of Example 1 suspended in 1200 ml. of commercial monochlorobenzene containing 0.5% by-weight of chlorinated rubber ("Parlon–125") and allowed to separate. Mechanical stirring was begun at a previously determined stirrer speed to produce a maximum size distribution of between −20+50 mesh. The mixture was heated with a surrounding oil bath and when the temperature reached 90° C. an azeotropic mixture of water and monochlorobenzene began to distill. Distillation was continued at 90° C. until most of the water had been removed. At this point, all of the beads were definitely well defined. Heating was continued until the temperature reached 125° C. and continued at this temperature for an additional 3 hours. The mixture was cooled and the resin beads filtered from the suspending medium. The resin beads were then subjected to a stream distillation with live steam in the presence of a small amount of phosphate for 3 or 4 hours until all of the monochlorobenzene was removed. The ion exchange resin when placed on an operating cycle using a regeneration dosage of 3.2 lbs. of sodium hydroxide per cubic foot of resin as a 5% solution and an influent feed water of 200 p.p.m. of mixed mineral acid and 17 p.p.m. of silica had an operating capacity of 26.8 kgr./cu. ft. The rinse volume of the material was found to be 3.5 bed volumes. Upon continuous operating cycling, the resin did not show any clumping or aggregation.

EXAMPLE 5

In a condensation flask similar to that described in Part B of Example 1, there were placed 932 grams of water heated to 65° C. A mixture containing 11 grams of 2-methyl 5-vinylpyridine (0.1 mole ratio to polyalkylene polyamine), 2.2 grams of 50% divinyl benzene (10% by weight of the methylvinylpyridine) and 0.5 gram of azo-bis-isobutyronitrile was suspended in the water. The suspension was heated with stirring at 60–65° for 30 minutes, whereupon 205.8 grams of tetraethylenepentamine was added at one time, the mixture cooled to 20° C. and 280.9 grams of epichlorohydrin (mole ratio of epichlorohydrin to tetraethylenepentamine 2.8:1) was slowly added during 2 hours at a temperature of about 30–35° C. The condensate syrup was then added at one time to the polymerization container as described in Part C of Example 1, where it was suspended in 2000 ml. of monochlorobenzene containing 1% by weight of chlorinated rubber ("Parlon–125") and allowed to separate. Mechanical stirring was begun at a previously determined stirrer speed to produce a maximum size distribution of between −20+50 mesh. The mixture was heated in a surrounding oil bath and when the temperature reached 90° C. an azeotropic mixture of water and monochlorobenzene began to distill. Distillation was continued at 90° C. until most of the water had been removed. At this point, all of the beads were definitely well defined. Heating was continued until the temperature reached 125° C. and continued at this temperature for an additional 3 hours. The mixture was cooled and resin beads filtered from the suspending medium and then subjected to a steam distillation with live steam in the presence of a small amount of trisodium phosphate for about 3 or 4 hours until all of the monochlorobenzene was removed. The ion exchange resin had an operating capacity, when using a regenerating dosage of 3.5 lbs. of sodium hydroxide per cubic foot as a 5% solution, of 29.0 kgr./cu. ft. using an influent feed water of 200 p.p.m. of mixed mineral acids and 17 p.p.m. of silica. The rinse volume was found to be 1.5 bed volumes. No clumping or agglomeration of the resin bed occurred during recycling of the resin.

EXAMPLE 6

Into a condensation flask equipped with a stirrer, thermometer, and surrounded with a cooling bath, 942 grams of water was placed. The water was heated to 60° C. and a mixture of 19.1 grams of 2-methyl, 5-vinyl-pyridine (0.2 mole ratio of the tetraethylenepentamine), 4.6 grams of 55% divinylbenzene (10% by weight of the methyl vinylpyridine) and 0.6 gram of azo-bis-isobutyronitrile was added. The suspension was stirred for 30 minutes at 60–65° C. At the end of this time, it was noted that the polymer suspension was completely soluble in a solution of tetraethylene-pentamine in water. To the suspension there was added 205.8 grams of tetraethylenepentamine. The solution cooled to 20° C. and 280 grams of epichlorohydrin (mole ratio of epichlorohydrin to tetraethylenepentamine 2.8:1) added during 2 hours with a maximum temperature of about 35°–40° C. The condensation syrup, which at the end of the addition was fairly clear, was then transferred to the polymerization reactor described in Part C of Example 1 containing 2000 ml. of monochlorobenzene and 1% by weight of chlorinated rubber. The mixture was then stirred at an appropriate speed to produce a maximum size distribution of between −20+50 mesh, and heated to 90° C., whereupon an azeotrope of water and monochlorobenzene began to distill. Distillation was continued at 90° C. until most of the water had been removed. At this point, all of the beads were definitely well defined. Heating was continued at this temperature until it reached 125° C. and continued at this temperature for an additional 3 hours. The resin was then filtered from the suspending medium and subjected to a steam distillation with live steam in the presence of small amounts of trisodium phosphate until all of the monochlorobenzene was removed. The ion exchange resin had a density of 280 grams per liter, a basicity of 7 kgr./cu. ft., an ultimate capacity of 45 kgr./cu. ft. and an operating capacity of 28 kgr./cu. ft., using a regenerant dosage of 3.2 lbs. per cubic foot of sodium hydroxide as a 5% solution and with an influent feed water of 200 p.p.m. of mixed mineral acid and 17 p.p.m. of silica. The rinse volume was approximately 2–3 bed volumes and the average leakage during the operating cycle was 1.5 mhos. No clumping or agglomeration of the polymer beads was observed during continued operating cycling, especially during the backwash part of the cycle.

With reference to Examples 1 through 6, the presence and the degree of clumping or agglomeration of weak base ion exchange resin during the backwash cycle were determined by placing a suitable quantity of the weak base ion exchange resin on an operating cycle consisting of a regeneration phase, a water rinse phase, an exhaustion phase and a backwash phase. In order to facilitate the accumulation of data within a reasonable time, the materials were placed on an automatic cycling device whereby each of the four phases of a cycle were duplicated in a fairly rapid sequence. The proportion of time usually assigned to each phase of the cycle was maintained during the automatic cycling but the total was diminished. At the end of approximately two hundred cycles, the tubes containing the materials were run through an operating cycle under manual observation and the operating capacity, the rinse volume, and the backwash characteristics were recorded.

EXAMPLE 7

In Table I below, a resin of this invention, as described in Example 6, is compared to Resin A, where Resin A is a commercially available bead type weak base ion exchange resin made by the condensation of epichlorohydrin and tetraethylenepentamine. Resin A is further characterized as having a basicity of approximately 7 kgr./cu. ft. and an ultimate capacity of between 45–48 kgr./cu. ft.

TABLE I.—COMPARATIVE LONG TERM TESTS

| No. of Cycles | Example 6 Resin | | | Resin A | | |
|---|---|---|---|---|---|---|
| | Operating Capacity, kgr./cu. ft. | Percent Agglom. | Rinse Volume | Operating Capacity, kgr./cu. ft. | Percent Agglom. | Rinse Volume |
| 0 | 22.0 | 0 | 2.0 | 20.6 | 0 | 12.5 |
| 200 | 22.4 | 0 | 3.6 | 20.6 | 0 | 5.0 |
| 400 | 20.0 | 0 | 3.6 | 22.0 | 100 | 4.5 |
| 600 | 22.2 | 0 | 4.1 | 20.6 | 100 | 3.4 |
| 800 | 22.0 | 10 | 4.9 | 24.6 | 100 | 5.3 |
| 1,000 | 21.8 | 0 | 3.2 | | | |

In the case of the comparative long-term tests shown above in Table I, the method was to take 200 ml. of ion exchange resin and place it in a 1″ diameter tube. The tubes were placed in an automatic cycle device so that the material was treated with the appropriate amount of regenerant consisting of 3.5 lbs. of sodium hydroxide per cubic foot of resin as a 5% solution. The influent feed water was 200 p.p.m. free mineral acid and 17 p.p.m. of silica. The time of contact of the regenerant and the influent feed water was proportioned to an actual operating time cycle under manual observation. When the tubes were placed on manual observation, the operating capacity of the weak base ion exchange resin was determined by standard methods and the backwash characteristics were observed at the end of the exhaustion cycle. The amount of agglomerates in the column bed was determined on a volume basis and the percentage agglomerated was calculated on the basis of the total volume of the resin bed. The rinse volume is defined as the number of the bed volumes of feed water necessary to reduce the conductance of the effluent water from the resin bed to approximately 22 micromhos or about 5 p.p.m. electroyltes expressed as calcium carbonate. After the attainment of average values by proceeding through 4–5 manual cycles, the materials were then again placed on the automatic cycling sequence and exposed for an additional 200 cycles.

The terms and expressions which I have employed are used as terms of description and not of limitation, and I have no intention, in the use of such terms and expressions, of excluding any equivalents of the features shown and described or portions thereof, but recognize that various modifications and changes may be made therein without departing from the principle of the claimed invention.

Having thus described my invention, what I claim and desire to protect by Letters Patent is:

1. A weakly basic, anion exchange resin comprising the condensation product of (a) an epihalohydrin, (b) a lower polyalkylene polyamine and (c) a fluid, partially cross-linked copolymer of (1) a monomer selected from the group consisting of an aliphatic amine and a heterocylic amine, said monomer having a polymerizable $CH_2=C<$ group, with (2) a cross-linking agent having at least two terminal $CH_2=C<$ groups, wherein said copolymer is present in molar proportions of from about 0.05 to about 1.0 mole per mole of said polyamine and said epihalohydrin is present in molar proportions of from about 2.5 to about 4 moles per mole of polyamine, and wherein said monomer constitutes from about 50 to 99.9 molar percent of said copolymer.

2. A weakly basic, anion exchange resin comprising the condensation product of (a) an epihalohydrin, (b) a lower polyalkylene polyamine and (c) a fluid, partially cross-linked copolymer of (1) a monomer selected from the group consisting of an aliphatic amine and a heterocylic amine, said monormer having a polymerizable $CH_2=C<$ group, with (2) a cross-linking agent having at least two terminal $CH_2=C<$ groups, wherein said monomer constitutes from about 50 to 99.9 molar percent of said copolymer, the molar proportions being from 0.1 to 0.5 mole of (c) per mole of (b) and from 2.5 to 4 moles of (a) per mole of (b).

3. A weakly basic, anion exchange resin as defined in claim 2 wherein the epihalohydrin is epichlorohydrin and the monomer is a vinyl pyridine.

4. A weakly basic, anion exchange resin as defined in claim 2 wherein the epihalohydrin is epichlorohydrin and the monomer is an (alkylpyridyl) alkyl acrylate.

5. A weakly basic, anion exchange resin as defined in claim 2 wherein the epihalohydrin is epichlorohydrin and said monomer constitutes from 80 to 99.5% by weight of the copolymer.

6. A weakly basic, anion exchange resin as defined in claim 5 wherein the cross-linking agent is selected from the group consisting of polyvinyl benzenes and acrylic diesters of aliphatic polyhydric alcohols.

7. A weakly basic, anion exchange resin as defined in claim 5 wherein said lower polyalkylene polyamine is tetraethylenepentamine, said monomer is a vinyl pyridine and said cross-linking agent is divinyl benzene.

8. A method of removing anions from solutions, which comprises bringing such solutions into contact with the anion exchange resin of claim 1.

9. A method of removing strong acid anions from aqueous solutions which comprises bringing such solutions into contact with the anion exchange resin of claim 5.

10. A process of preparing a weakly basic anion exchange resin comprising condensing a fluid, partially cross-linked copolymer prepared from a monomer selected from the group consisting of an aliphatic amine and a heterocylic amine, said monomer having a polymerizable $CH_2=C<$ group, with a cross-linking agent having at least two terminal $CH_2=C<$ groups, said monomer constituting from about 50 to 99.9 molar percent of said copolymer, with an epihalohydrin and a lower polyalkylene polyamine wherein said copolymer is present in molar proportions of from about 0.05 to about 1.0 mole per mole of said polyamine and said epihalohydrin is present in molar proportions of from 2.5 to about 4 moles per mole of polyamine.

11. A process of preparing a weakly basic anion exchange resin comprising partially condensing a fluid, partially cross-linked copolymer prepared from a monomer selected from the group consisting of an aliphatic amine and a heterocyclic amine, said monomer having a polymerizable $CH_2=C<$ group and a cross-linking agent having two terminal $CH_2=C<$ groups, said monomer constituting from about 50 to 99.9 molar percent of said copolymer, with an epihalohydrin and a lower polyalkylene polyamine; wherein said copolymer is present in molar proportions of from about 0.1 to about 0.5 mole per mole of said polyamine and said epihalohydrin is present in molar proportions of from about 2.5 to about 4 moles per mole of polyamine, dispersing said partial condensate in an inert organic non-solvent suspending medium and completing the condensation with agitation to produce the exchange resin in the form of spheroidal particles.

12. A process of preparing weakly basic anion exchange resins as defined in claim 11 wherein said copolymer is added to said polyalkylene polyamine prior to the addition of said epihalohydrin.

13. A process of preparing weakly basic anion exchange resins as defined in claim 12 wherein said copolymer is prepared by aqueous suspension polymerization.

14. A process of preparing weakly basic anion exchange resins as defined in claim 11 wherein said epihalohydrin is epichlorohydrin and said suspending medium is monochlorobenzene with the weight ratio of partial condensate to suspending medium being from 1:15 to 1:2.

15. A process of preparing weakly basic anion exchange resins as defined in claim 11 wherein the epihalohydrin is epichlorohydrin and the monomer is a vinyl pyridine.

16. A process of preparing weakly basic anion exchange resins as defined in claim 11 wherein the epihalohydrin is epichlorohydrin and the monomer is an (alkylpyridyl) alkyl acrylate.

17. A process of preparing weakly basic anion exchange resins defined in claim 11 wherein the epihalohydrin is epichlorohydrin and said monomer constitutes from 80 to 99.5% by weight of the copolymer.

18. A process of preparing weakly basic anion exchange resins as defined in claim 17 wherein the cross-linking agent is selected from the group consisting of polyvinyl benzenes and acrylic diesters of aliphatic polyhydric alcohols.

19. A process of preparing weakly basic anion exchange resins as defined in claim 17 wherein said lower polyalkylene polyamine is tetraethylenepentamine, said monomer is a vinyl pyridine and said cross-linking agent is divinyl benzene.

References Cited by the Examiner

UNITED STATES PATENTS

| | | | |
|---|---|---|---|
| 2,469,683 | 5/1949 | Dudley et al. | 260—2.1 |
| 2,540,984 | 2/1951 | Jackson | 260—2.1 |
| 3,022,253 | 2/1962 | McMaster | 260—2.1 |

WILLIAM H. SHORT, *Primary Examiner.*

C. A. WENDEL, *Assistant Examiner.*